United States Patent [19]
Bahder

[11] Patent Number: 4,457,975
[45] Date of Patent: * Jul. 3, 1984

[54] TREE RESISTANT POWER CABLE

[75] Inventor: George Bahder, Edison, N.J.
[73] Assignee: Cable Technology Laboratories, Inc., New Brunswick, N.J.

[ * ] Notice: The portion of the term of this patent subsequent to Aug. 24, 1999 has been disclaimed.
[21] Appl. No.: 391,348
[22] Filed: Jun. 23, 1982

Related U.S. Application Data

[63] Continuation of Ser. No. 235,090, Feb. 17, 1981, Pat. No. 4,354,992, which is a continuation-in-part of Ser. No. 147,212, May 6, 1980, abandoned.

[51] Int. Cl.³ ................ B29F 3/10
[52] U.S. Cl. ................ 428/394; 264/558; 264/565; 264/566; 264/174; 264/237; 425/71; 425/72 R; 425/503; 425/509; 425/113; 425/326.1; 425/384; 425/387.1; 425/392; 425/445
[58] Field of Search ................ 264/557, 124, 237, 558, 264/560, 565, 566; 425/72 R, 503, 509, 113, 71, 326.1, 384, 387.1, 388, 392, 445; 428/462, 375, 394

[56] References Cited

U.S. PATENT DOCUMENTS

| | | | |
|---|---|---|---|
| 2,540,497 | 2/1951 | Stiegler | 425/384 |
| 2,656,566 | 10/1953 | Berggren | 264/174 |
| 3,513,228 | 5/1970 | Miyauchi et al. | 425/509 |
| 3,538,207 | 11/1970 | Toole | 264/174 |
| 3,689,610 | 9/1972 | Nicholson | 264/174 |
| 3,737,490 | 6/1973 | Nicholson | 264/40.7 |
| 3,769,085 | 10/1973 | Matsubara | 174/120 S |
| 3,800,019 | 3/1974 | Parsey et al. | 264/102 |
| 3,846,528 | 11/1974 | Chrisman et al. | 264/174 |
| 3,868,436 | 2/1975 | Ootsuji et al. | 264/174 |
| 3,869,235 | 3/1975 | Moore | 425/113 |
| 3,922,128 | 11/1975 | Solomon | 425/113 |
| 3,928,525 | 12/1975 | Fuwa et al. | 264/174 |
| 4,089,917 | 5/1978 | Takiura et al. | 264/40.3 |

FOREIGN PATENT DOCUMENTS

| | | | |
|---|---|---|---|
| 505162 | 5/1939 | United Kingdom | 425/113 |

*Primary Examiner*—Jeffery R. Thurlow
*Attorney, Agent, or Firm*—Darby & Darby

[57] ABSTRACT

An improved method and apparatus for fabricating insulated cables, particularly polymeric insulated electrical power cables, resistant to the formation and growth of electrochemical trees is disclosed. Internal pressure on the conductor side of the cable is maintained lower than the external pressure on the outer surface of the insulation during extrusion. Extrusion pressure higher than the external pressure results in expansion of the insulation following extrusion. This expansion or swelling reduces the number and size of cracks and voids which are precursors of electrochemical trees. In addition, pressure curing the extruded, insulated cable with a curing medium above its melting point followed by gradual gradient cooling under internal pressure and higher external cooling fluid pressure to around room temperature optimizes the resistance of the cable to nucleation and growth of electrochemical trees.

8 Claims, 9 Drawing Figures

TREE RESISTANT POWER CABLE

The present application is a continuation of application Ser. No. 235,090 filed Feb. 17, 1981, now U.S. Pat. No. 4,354,992, which was a continuation-in-part of Ser. No. 147,212 filed May 6, 1980, now abandoned.

This invention relates to an improvement in the manufacture of insulated electric power cables. More specifically, it relates to a method and means of improved fabrication techniques for reducing insulation failures in underground sections of these cables.

Power cables of the type here involved generally consist of the stranded conductor, an extruded semiconducting conductor shield, a polymeric insulation (such as polyethylene (PE), cross-linked polyethylene (XLPE), ethylene propylene rubber (EPR) and others), a semiconducting insulation shield, metallic shield, and optionally a polymeric jacket. It is recognized that when moisture, or other conducting liquid enters into the insulation structure of energized polymeric insulated cables it forms so-called electrochemical trees in the areas of critical imperfections.

These electrochemical trees are discussed in my copending applications Ser. Nos. 5,320 and 5,321, both of which were filed on Jan. 22, 1979. These trees consist of small channels that decrease the dielectric strength of the polymeric insulation. Microscopic observation of wafers taken from cross-linked polyethylene cable insulation indicate that the electrochemical trees originate from cracks or oblong voids in the insulation adjacent to imperfections which consist of conducting particles or other foreign inclusions. This observation also indicates that the electrochemical trees are more plentiful in the portion of insulation adjacent to the conductor shield, becoming smaller and less numerous in the insulation close to the insulation shield in cables in which these three layers (conductor shield, insulation and insulation shield) are extruded, cured and cooled in a single operation. This characteristic was originally attributed to lower voltage stress at the insulation shield than at the center of the insulation or at the conductor shield.

Further studies now indicate that the main reason for this irregular distribution of these trees may be atributed to problems associated with the conventional, currently utilized manufacturing processes for polymeric insulated cables. These processes induce relatively small imperfections in the insulation close to the insulation shield. The severity of these imperfections in the insulation increases towards the conductor shield.

Imperfections causing induction of electrochemical trees consist of small cracks and small or large voids, especially oblong in the field direction, which when filled with water create high electric stresses. Creaks in the insulation, although typically very small (e.g. less than 1 mil long) are believed to be the most common cause for formation of electrochemical trees.

Under typical manufacturing conditions, in the case of cross-linked polyethylene and ethylene propylene rubber insulated cables, the three layers (conductor shield, insulation and insulation shield) are extruded, cross-linked and cooled under pressure, or just extruded and cooled under pressure in the case of polyethylene insulated cables. In both cases the temperature of the three cable core layers, just before cooling, ranges from 250 to 550 degrees Fahrenheit.

The thermal expansion coefficient of polyolefin insulation is relatively high. The volume of the insulation just before cooling is up to 10 to 16% larger than the volume of this insulation at room temperature. In conventional cable manufacturing processes, the coolant (such as water, nitrogen, etc.) is applied under pressure to the external surface of the extruded cable core. Hence, cooling and solidification begins from the external surface of the cable core and progresses gradually towards the conductor. Prior to beginning the cooling process, the insulation system is soft and is compressed against the conductor by the coolant. During cooling, the external part of the cable core solidifies and acts as a rigid pipe barrier while the internal part of the insulation system, which is still soft, contracts and subsequently solidifies.

Contraction and solidification of the internal soft part of the insulating system within the solidified external part of the cable core occurs at a relatively low pressure because the pressure of the coolant is substantially diminished by the presence of the external solidified part of the cable core. Thus, the pressure at which the cable core is solidified equals the coolant pressure at the insulation shield surface, but this pressure decreases rapidly in direction towards the conductor as the external portion of the insulation solidifies.

Consequently, the number and size of the imperfections which induce electrochemical trees and decrease dielectric strength of the insulation is smallest at the insulation shield side. The number and size of the imperfections increase towards the conductor shield where the voltage stress is the highest.

Polymeric insulation structures are compressible. The liquid or gas pressure applied during the cooling of these structures compresses the solidified part of the cable core, but compensates only partially for the deficiency in compound volume during cooling of the internal part of the cable core. Consequently, the internal part of the cable core is cooled and solidified at a lower pressure than the outside. As the thickness of the wall of the insulation system increases, the greater is the pressure drop (and hence the level of imperfections) towards the conductor during cable core solidification.

During cable core cooling, the insulation structure, especially in the case of thermoset materials, also has an internal pressure created by vapors and gases generated by the cross-linking reaction and also by the dissolution of contaminants such as air, steam and other vapors existing in the compounds. External pressure applied to the insulation system during its solidification tends to suppress the internal pressures from the gases in the insulation. This in turn reduces the void sizes in the insulation.

In addition, application of external pressure during cooling causes mechanical stresses in the radial direction of the insulation system. When the cable core leaves the pressurized cooling pipe, the mechanical stresses relax, causing a small radial expansion of the insulation which facilitates the formation of cracks and oblong voids especially at contaminants and protrusions of the conductor and insulation shield layers. These cracks and voids constitute the most critical imperfections in the insulation structure and lead to the formation of electrochemical trees and to the premature failure of the cable.

Conventionally, in the manufacture of crosslinked polyethylene and ethylene-propylene rubber insulated cables, pressure extrusion is utilized without internal gas or liquid pressure in the cable conductor and without gradient cooling of the cable core. It has been found that the increase in diameter or swelling of the cable core by more than 3% of the insulation shield diameter is necessary to reduce the number and size of the oblong voids in the insulation. In addition gradient cooling of the cured insulated cable is also necessary to reduce the number and size of the oblong voids in the insulation. Gradient cooling refers to a gradual cooling of the cured insulated cable which takes place along the length of the cooling pipe. The cured insulated cable is gradiently cooled from the temperature of the cured insulated cable, as it leaves the curing step, down to about room temperature at the end of the cooling pipe furthest away from the curing section of the apparatus.

Some cooling naturally occurs in pressurized cooling tubes used in lines for manufacturing crosslinked polyethylene and ethylene-propylene rubber insulated cables. However, the difference between the temperature of the cured insulated cable as it leaves the curing section and the temperature of the cooling medium closest the curing section is too large. This temperature difference results in abrupt cooling leading to cables vulnerable to the formation of electrochemical trees.

Gradient cooling is used in polyethylene insulated cables which are not resistant to the formation of electrochemical trees but the low resistance has been found to be a result of the absence of internal and external pressure during the cooling.

U.S. Pat. No. 3,737,490 discloses pressurization of the conductor to produce an extruded composite covering. This covering comprises two or more layers of different covering materials extruded over a continuously advancing core by a float down process. Pressurization is set forth in conjunction with the extrusion of cables having a diameter smaller than the diameter of the die of the extrusion head. Consequently the insulation structure produced by the prior art process is not compressed in the head and the die. Such a process has been found to lead to a porous insulation structure which is vulnerable to the formation of electrochemical trees. It has been found that in order to produce a cable with high dielectric strength, the cable insulation structure must be compressed in the head and in the die. The diameter of the cable exiting the die must be greater than the diameter of the die.

The essence of the present invention is to provide polymer insulated cables having higher resistance to the formation and growth of electrochemical trees by applying internal and external extrusion pressure to the conductor in combination with gradual gradient cooling of the insulated cable.

In addition, I have found that the sensitivity of the polymeric insulated cables to the formation of electrochemical tree also depends on the medium used for curing and cooling, on the type of compound used for insulation.

It is established in accordance with this invention that each of the following steps reduce the formation of cracks and oblong voids in the insulation structure during its manufacturing process:

(a) extruding the insulation structure at high pressure and subsequently internally and externally compressing the insulation structure at a pressure slightly lower than the extrusion pressure in the radial direction during curing and cooling;

(b) curing the insulation in a specially selected fluid;

(c) cooling the insulation with a gradual temperature gradient to minimize formation of cracks in the insulation, starting the cooling process at a temperature higher than the melting temperature of the curing compound and finishing the cooling process at around room temperature, and;

(d) modifying the insulation compound to reduce its sensitivity to cracking.

In accordance with the present invention, a method and means are provided whereby insulated power cable rated 10 kv and above has three layers (conductor shield, insulation and insulation shield) pressure extruded, pressurized internally (from the stranded conductor side) and externally (from the insulation side), cured, and cooled under a temperature gradient starting at a temperature higher than the melting temperature of the insulation and gradually decreasing to room temperature or lower. In so doing, the cracks and voids in the in the insulation are reduced in size and number, and are more uniformly distributed throughout the insulation. This in turn reduces insulation imperfections such as the above-referenced electrochemical trees, and thereby extends the useful life of the power cable.

It is therefore an object of this invention to provide a method and means for fabricating an improved insulated electric power cable rated 10 kv and above characterized by a reduction in the number and size of cracks and voids in insulation and by a more uniform distribution of these voids in the insulation.

It is another object of this invention to provide a method and means for pressure extrusion of the insulation structure, for pressurizing the insulated power cable internally and for gradual curing and cooling of the insulation structure during the cable fabrication so as to provide an improved, more failure-resistant, cable.

It is a further object of this invention to provide a method and means for controlling both the internal and external pressure exerted against the insulation coating of an electric power cable curing its fabrication so as to improve the reliability and performance characteristics of that insulation when the cable is put in service.

It is a still further object of this invention to provide an insulated power cable especially well suited to resist breakdown in insulation frequently encountered by contact with moisture in underground installations.

It is a still further object of this invention to provide the above-described cable through the use of relatively simple and inexpensive means and method.

The above-described objects, advantagees and features of the invention will be apparent from the following description in conjunction with the appended drawings, in which.

Figure 4:
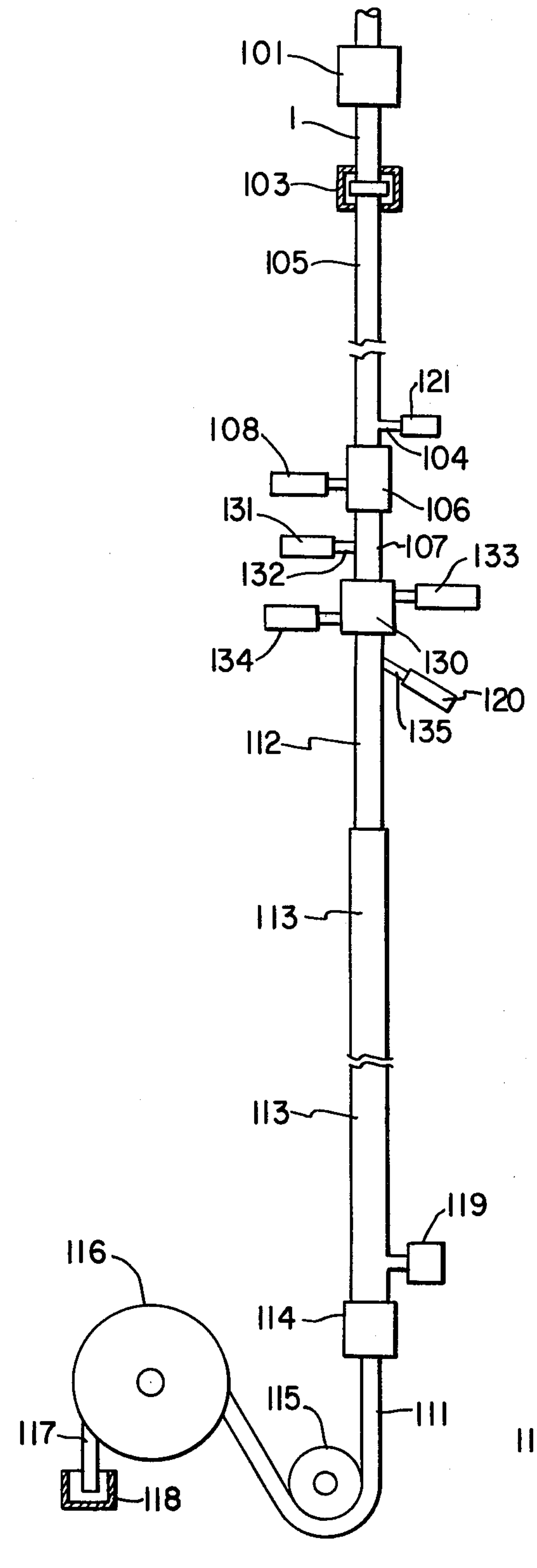
Figure 4B:
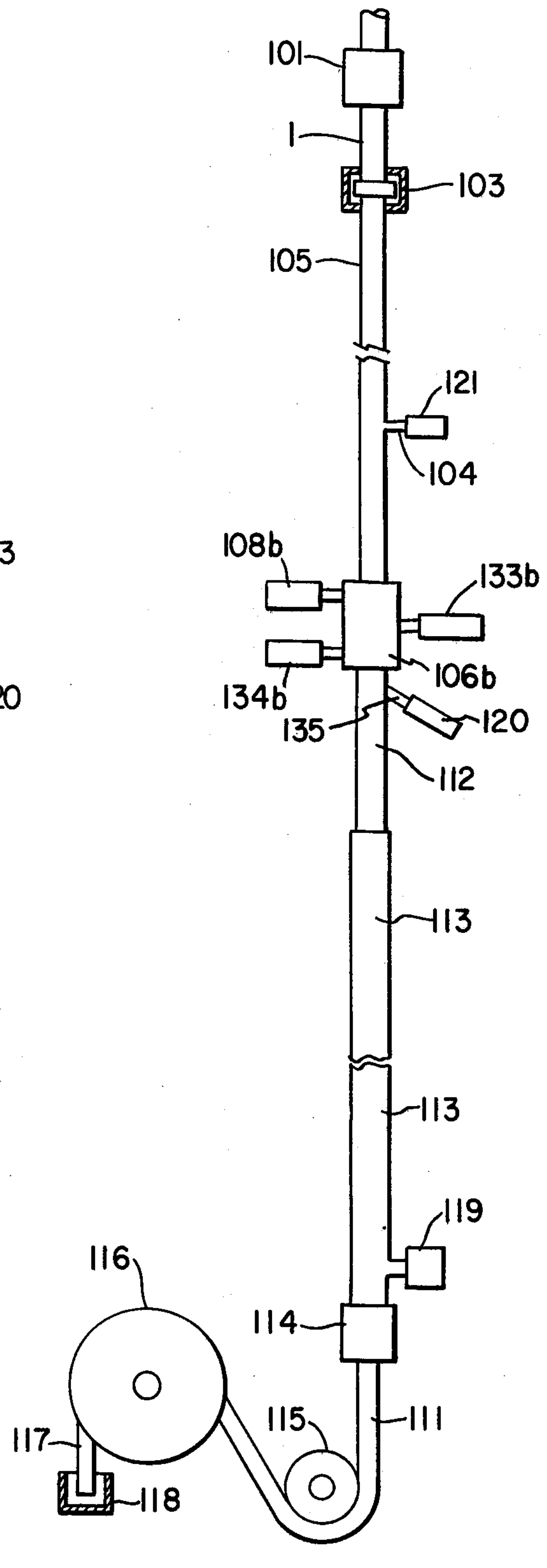
Figure 4A:
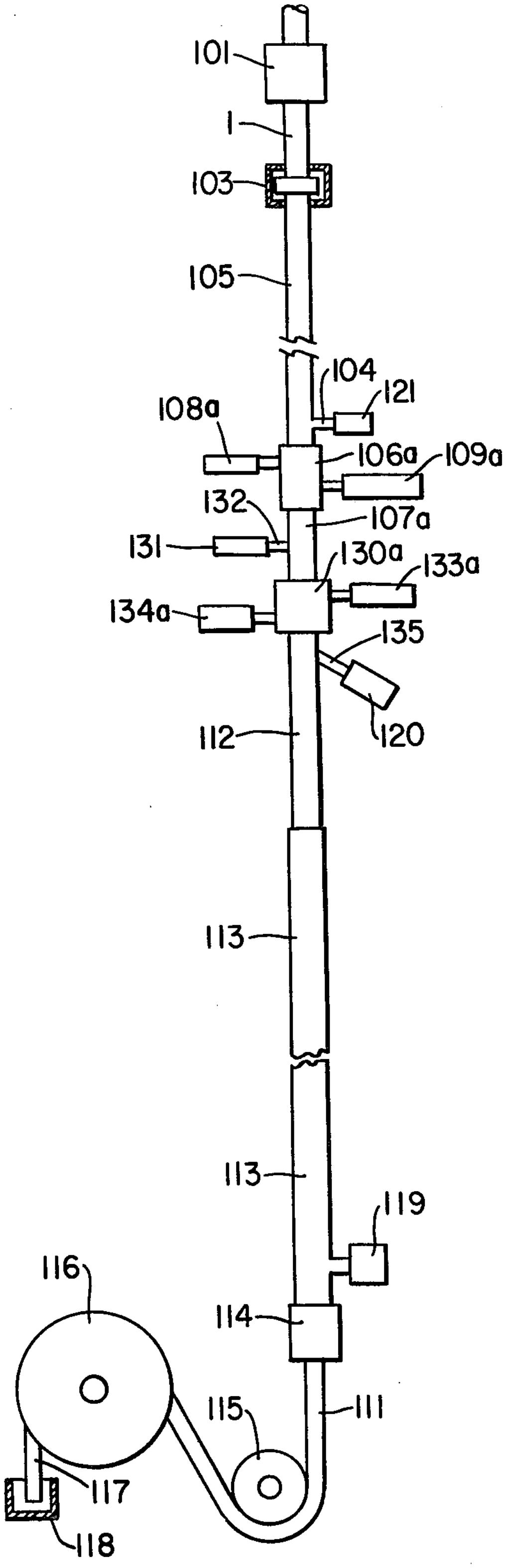

FIGS. 4, 4*a* and 4*b* are schematic diagrams of three embodiments of an extrusion line suitable for fabricating cable in accordance with this invention.

Figure 5:
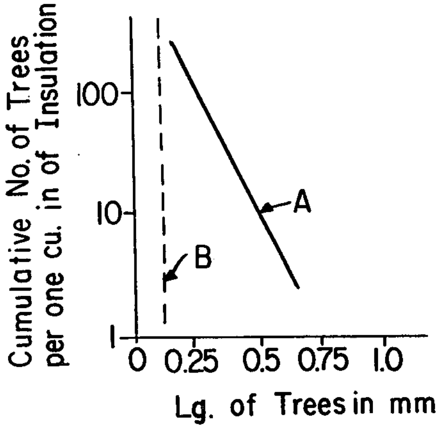

FIG. 5 is a graph representing the count of various lengths of electrochemical trees in a prior art cable and in one made in accordance with this invention.

Figure 6:
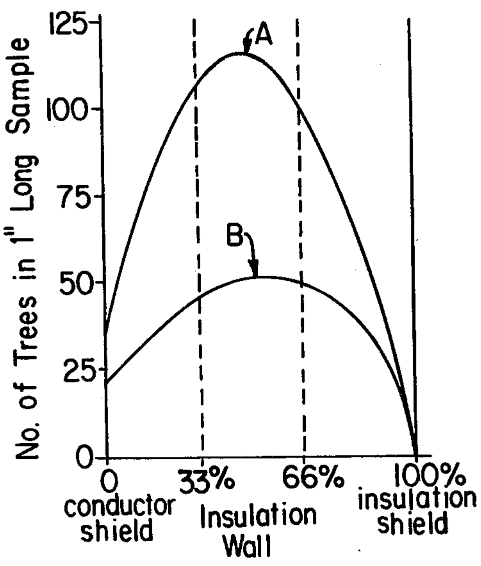

FIG. 6 is a graph representing the count of electrochemical trees longer thanf 2 mils, counted separately in five sections of the insulation structure.

Figure 7:
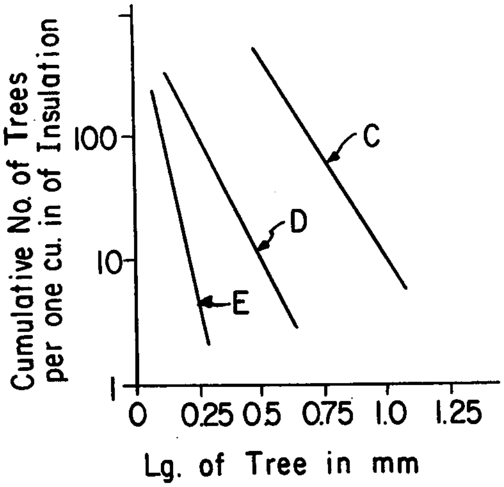

FIG. 7 is a graph representing the electrochemical tree count of cables subjected to different curing operations in accordance with this invention.

Figure 1:
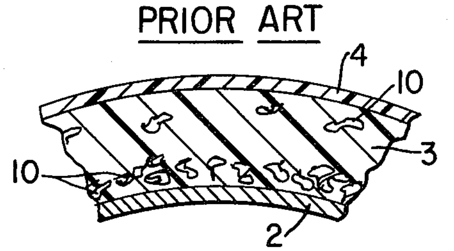
FIG. 1 PRIOR ART
FIG. 1 is a partial cross-section schematically illustrating the distribution and location of imperfections in a typical prior art insulated power cable.

Referring to FIG. 1, there is shown schematically the manner of distribution of voids or imperfections between the conductor shield and insulation shield in a typical prior art power cable. Note that the imperfections are concentrated in the portion more closely adjacent the conductor shield. The apparent reason for this is discussed above, i.e., pressure distribution and temperature gradient during the insulation cooling process.

Figure 2:
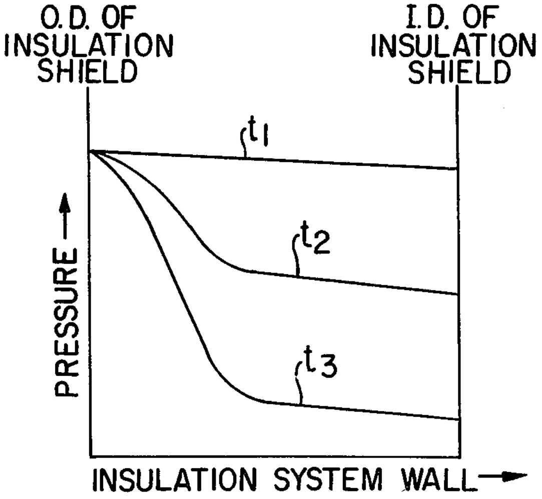
FIG. 2 is a graph qualitatively representing pressure distribution in the insulation at times corresponding to the cooling stages of the insulation in a typical prior art insulated power cable.

Referring to FIG. 2, the referenced pressure distribution is qualitatively represented. Curve $t_1$ represents pressure distribution just prior to the cable core cooling. Curve $t_2$ represents pressure distribution when a part of the external layer of the cable core is already solidified. Curve $t_3$ represents pressure distribution in the cable core at a longer cooling time than that corresponding to curve $t_2$.

Figure 3:
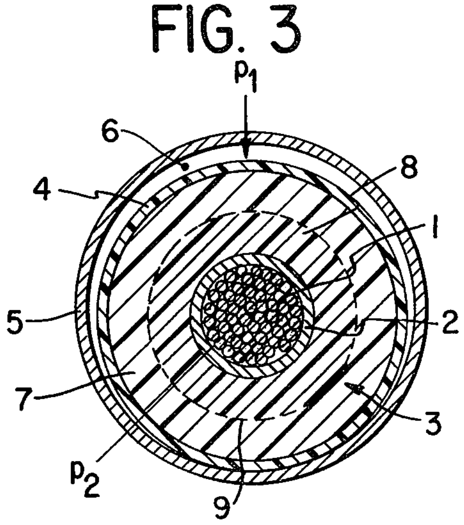
FIG. 3 is a cross-section of an embodiment of a cable in accordance with the present invention.

Referring now to FIG. 3, the basic principle of the invention (when used in conjunction with the horizontal mini-pipe extrusion system described in U.S. Pat. No. 4,080,131) is illustrated. The cable core consisting of conductor 1, conductor shield 2, insulation 3 and insulation shield 4 is cooled in a pipe 5 filled with a pressurized fluid cooling medium 6 such as steam, gas or other liquid. For illustration purposes, the insulation 3 is divided by the boundary 9 into two regions of solidified (7) and soft (8) isulation. During the cooling process, the boundary 9 moves towards the center of the conductor.

Referring to FIG. 4 there is shown a schematic diagram of a first embodiment of a horizontal extrusion line for manufacture of cables in accordance with this invention. The extrusion line includes a metering capstan 101 for the stranded cable conductor 1. Conductor 1 passes through a seal 103 that minimizes the overflow of gas or liquid which is introduced into the conductor 1 by pump 121 through an inlet 104. A pipe 105 which is attached to a single extrusion head 106 on one end and to seal 103 on the other end minimizes the loss of gas or liquid delivered by pump 121. A conductor shield is pressure extruded over the conductor 1 by conductor shield extruder 108 in single head 106. The conductor and conductor shield then pass through gas pressurized tube 107, having one end sealed to the single head 106 and the other end sealed to a double head 130. The tube is pressurized with air or other gas as through inlet 132 by pump 131. An insulation layer is pressure extruded by extruder 133 over the conductor shield and an insulation shield is then pressure extruded by extruder 134 over the insulation layer in the dual head 130.

The cable core 111 extruded by single head 106 and dual head 130 enters into a mini-curing pipe 112, sealed on one end to the dual extrusion head 130 and on the other end to the cooling pipe 113. The core is cross-linked with the help of a curing liquid introduced into curing pipe 112 through inlet 135 by pump 120. The curing pipe is heated to any desirable curing temperature by any conventional heating means.

Subsequent to curing the cable core 111 enters into the cooling pipe 113 which is supplied with cooling fluid by pump 119. The cooling fluid seal 114 prevents the cooling liquid from escaping the cooling system. The take-up tension of the cable core is provided by the pull-out capstan 115. The cable core is wound on the take-up 116. The starting end 117 of the cable core is sealed by means of a reinforced end cup 118 (for example a heat-shrinkable or equivalent seal).

In a second embodiment shown in FIG. 4*a* there are two dual heads 106*a* and 130*a*. The conductor shield and a first insulation layer are pressure extruded in the first dual head 106*a* and a second insulation layer and the insulation shield are pressure extruded in the second dual head 130*a*.

In the first dual head 106 the conductor shield is pressure extruded over the conductor by the extruder 108*a*. The first insulation layer is then pressure extruded over the conductor shield by extruder 109*a* in the first dual head 106*a*. The conductor, conductor shield and first insualtion layer is passed through tube 107*a* into the second dual head 130*a*. A second insulation layer is pressure extruded over the first insulation layer by extruder 133*a* and an insulation shield is pressure extruded over the second insulation layer by extruder 134*a*. The cable core 111 extruded by both dual heads 106*a* and 130*a* is then cured, gradiently cooled under pressure and wound on the take-up 116 as described above as in the first embodiment.

In a third embodiment shown in FIG. 4*b* there is only one head 106*b*. The head 106*b* is a triple extrusion head. The conductor shield is pressure extruded in head 106*b* over the conductor by extruder 108*b*. The insulation layer is then pressure extruded over the conductor shield in head 106*b* by extruder 133*b*. The insulation shield is then pressure extruded over the insulation layer in head 106*b* by extruder 134*b*. The cable core extruded in the triple head 106*b* is then cured, gradually cooled under pressure and wound on the take-up 116 as in the first two embodiments.

Cables manufactured by such triple extrusion head 106 apparatus have been found on a statistical basis to have lower dielectric strength than cables manufactured with two layers of insulation as in the second embodiment. This is due to the fact that the first part of the insulation adjacent to the conductor shield will not be compressed as well as in the two dual head arrangements of the second embodiment.

When the conductor 1 is pressurized by gas, a portion of the gas escapes to the environment through seal 103. The portion of gas that escapes to the environment can be minimized by using pipe 105 with a relatively tight fit to the conductor and by increasing the length of pipe 105. If the conductor is pressurized by means of a liquid, a special collector (not shown) similar to a water seal box can be used to collect the portion of the liquid that can escape through seal 103.

The following apparatus design criteria and processing conditions are maintained to manufacture high quality polymeric insulated cables which are resistant to the formation of electrochemical trees:

1. The gas or liquid pressure, maintained by pump 121, is higher than 50 psi preferably maintained below 500 psi and always lower than the cooling fluid pressure.

2. The head 106*a* is designed such that the die for the extrusion of the conductor shield constitutes one part with the tip of the die for the extrusion of the first part of the insulation. This construction ensures that the insulating compound continuously cleans the die of the conductor shield preventing the accumulation of carbon black particles or carbon black clusters. These clusters would otherwise break off from the die and remain in the insulation and cause projections which lead to lower breakdown voltage and the formation of electrochemical trees in the insulation.

3. Both the conductor shield layer and the first part of the insulation layer are pressure extruded to minimize the formation of oblong voids in this part of the cable core. This is accomplished by maintaining the diameter of the first layer of the insulation slightly greater than the diameter of the die for the extrusion of this insulation. The thickness of the first part of the insulation is between 10 mils and 50 mils.

4. The gas pressure in tube 107 connecting the two heads 106 and 130 is at least 15 psi higher than the gas pressure introduced by pump 121 while at the same time at least 50 psi lower than the extrusion pressure in head 106.

5. The output of the compound from the insulation extruder is controlled so that the diameter of the cable core 111 exiting from heads 130, 130*a* and 130*b* into curing pipe 112 is at least 3% greater than the diameter of the die used for extrusion of the insulation shield. This difference in diameter assures high extrusion pressure of the insulation and minimizes formation of voids, including oblong voids, which may result in electrochemical trees in wet cable environments. The diameter of the curing pipe 112 is greater than the diameter of the insulation shield die preferrably by at least 5% but not greater than 50% of the diameter of the finished cable measured at room temperature.

6. The curing liquid pressure is not lower than 250 psi, preferably higher than 400 psi, and not lower than the cooling fluid pressure.

7. The temperature of the cooling liquid in cooling pipe 113 at the connection point of cooling pipe 113 with curing pipe 112 is higher than the melting temperature of the compounds used for the manufacture of the cable core in order to minimize internal thermal stresses in the cable core and minimize cracks and voids in the insulation structure. Preferably the temperature at this connecting point is equal to the temperature of the curing liquid which is typically in the range of 240° to 550° F. The temperature of the cooling pipe should gradually decrease by gradient cooling. The gradient cooling should be selected to maintain a temperature difference between the conductor and the insulation shield of not more than 150 degrees Fahrenheit.

Pressure extrusion with the pressurization of the conductor and gradual gradient cooling of the insulation during cable core manufacture can also be applied to conventional extrusion, curing, cooling lines arranged vertically or in a catenary configuration and utilizing steam, gas or liquid for curing and cooling of the cable core. In the case of a catenary line, the pipe 105 would have a catenary shape. Dry air or nitrogen are inexpensive gases suitable for pressurization of the conductor.

The conductor shield can also be pressurized during the manufacturing process with liquids or vaseline-type compounds having a softening point slightly below the softening point of the compounds used for cable cores. Silicone fluid, microwaxes, compounds made of polyethylene dissolved in insulating oils and mixed with microwaxes or rubber and numerous other mixtures compatible with the cable insulating system can be used for pressurization of the cable core during the manufacturing process. The vaseline-type compounds, when left between the strands of the conductor of finished cables, prevent the longitudinal flow of moisture during cable service and thereby will further improve the resistance of the cables to formation of electrochemical trees.

Referring to FIG. 5, there is shown a graph representing electrochemical tree count in 15 kV cross-linked polyethylene insulated cables. Curve A relates to a conventional 15 kV cable and curve B relates to a 15 kV cable where the conductor shield was pressurized from the conductor side during gradual gradient cooling with dry nitrogen at 60 psi. Both cables were subjected to a 30 day exposure to water (in the conductor area and the cable environment) at 1500 Hz voltage, at a voltage stress of 85 volts per mil. The cable having its conductor shield pressurized during the gradual gradient cooling process (curve B) indicates a significant reduction in number and length of electrochemical trees.

Referring to FIG. 6, there is shown a graph representing another electrochemical tree count in 15 kv cross-linked polyethylene cables. Curve A relates to conventional 15 kv cable and curve B relates to a 15 kv pressure extruded cable where the conductor shield was pressurized from the conductor side with dry nitrogen at 90 psi and was cooled gradually by gradient cooling. Both cables were subjected to a 90 day exposure to water, in the conductor area and in the cable environment, at 60 Hz voltage, and voltage stresses of 85 volts per mil.

In the tree count shown in FIG. 6, the trees with length in excess of 2 mils were counted separately in five sections of the insulation structure: at the conductor shield, in ⅓ of the insulation wall adjacent to the conductor shield, in ⅓ of the insulation located in the center of the insulation wall, in ⅓ of the insulation adjacent to the insulation shield, and at the insulation shield. FIG. 6 shows that the cable, pressure extruded and gradiently cooled under internal pressure, develops much fewer trees than the cable manufactured in a conventional process. The internal pressure maintained in the pressure extruded cable during gradual gradient cooling minimized the size of the cracks and oblong voids.

The samples of 15 kv cross-linked polyethylene insulated cables, having the tree count as shown in FIG. 6, were subjected to an a.c. voltage breakdown test. In this test the a.c. voltage was increased in 10 percentage steps evey minute. The average breakdown voltages measured, in three cable samples of both types of cables, are given in Table 1.

TABLE 1

| | XLPE Cable | XLPE Cable Pressure |
|---|---|---|
| | Conventional Process | Extruded - Heated and Cooled under Internal Pressure in Accordance with this invention |
| Breakdown Voltage | | |
| Prior to treeing test kv | 195 (100%) | 169 (100%)* |
| After treeing test kv | 70 (36%) | 72 (43%) |

*The lower breakdown voltage before the treeing test of the cable made in accordance with the invention is attributed to a smaller insulation thickness caused by different processing conditions.

Table 1 indicates that the decrease in breakdown voltage of the cable manufactured in accordance with the invention occurs at a significantly lower rate than the decrease of break-down voltage of cable manufactured in a conventional way. After approximately three months of electrochemical treeing tests, the cable made in accordance with the present invention retained 43% of the original breakdown voltage while the cable of the conventional process retained only 36% of the original breakdown voltage.

In addition, I have found that the sensitivity of the polymer insulated cables to formation of electrochemical trees also depends on the medium used for curing, and to some degree on the medium used for cooling of the cable core during the manufacturing process. Cable cores dry cured under hot gas pressure (such as nitrogen) or under a pressure of a hot high molecular weight liquid (which does not penetrate into the insulation) and cooled under water are very susceptible to formation and growth of electrochemical trees. On the other hand, cable cores cured by steam and cooled by water are less susceptible to formation of electrochemical trees, although, after manufacture, they contain more moisture and exhibit more and larger voids in the insulating system than the cable cores cured in nitrogen or high molecular weight liquids.

Curing by steam has some negative and some positive effects on the insulation compound as compared with so-called dry curing performed under nitrogen or under high molecular weight liquid pressure. Steam entering the cable core during curing condenses in the insulation during cooling and forms macroscopic, spherical voids which typically decrease the dielectric strength of the insulation, but do not nucleate electrochemical trees.

The positive feature of steam curing is that steam minimizes adverse effects of the cross-linking agent, facilitates cable expansion and contraction during curing and cooling and consequently decreases the number and size of microscopic cracks of oblong voids responsible for nucleation of electrochemical trees. Hence, cable cores cured in steam exhibit less susceptibility to formation of electrochemical trees than the cables cured and cooled by nitrogen or high weight molecular liquids. The disadvantages of steam curing is that moisture is introduced into the cable core during the manufacturing process and this moisture may lead to electrochemical trees even if there is no external moisture admitted to the cable during testing or servicing.

In order to further optimize cable resistance to nucleation and growth of electrochemical trees, the cable core should be cured under pressure exerted by a special curing medium. The curing medium should have good electrical properties, should have properties of a plasticizer, and should have the potential for diffusing into the insulation during the curing process. The curing medium may consist of a mixture of ingredients with at least one ingredient having the following properties:

| | |
|---|---|
| Dielectric Constant | 20 |
| Resistivity | $10^{10}$ ohm-cm |
| Boiling Point At Curing Pressure | 85° C. |
| Molecular Weight | 300 |

Acetophenone, high molecular weight polybutene oil, glycerol, silicone fluid, dodecylbenzene, and other liquids satisfy these conditions. The special curing medium may be applied solely from the external side, or from both external and internal sides of the cable.

Referring to FIG. 7, this chart represents the effect of curing medium on the insulation and formation of electrochemical trees in 15 kV cross-linked polyethylene insulated cables subjected for 30 days to 1500 Hz voltage at voltage stress of 85 volts per mil with water surrounding the cable and filling the interstices of the conductor. During the curing process, these cables were not pressurized from inside. Curve C relates to a dry cured cable, curve D relates to a steam cure cable, and curve E relates to a cable cured in acetophenone.

Further, I have found that the type of insulating compounds used has a significant effect on formation of cracks and voids in the insulation structure during the manufacturing process. Crosslinked polyethylene insulation extruded of copolymers such as ethylene and vinyl acetate or ethylene and ethyl acrylate is more resilient and more resistant to the formation of electrochemical trees than the insulation extruded from homopolymers. Copolymers are very widely used in insulating and semiconducting compounds filled with carbon black or clay particles because they can be well mixed with these particles to provide good adhesion between the compound and the particles. Copolymers, however, are not conventionally used in unfilled compounds designed for insulation in high voltage polymeric insulated cables rated 10 kV and above consisting of conductor shield, insulation and insulation shield. This is due to the fact that copolymers have higher loss factor, less resistance to thermal aging and higher price than the unfilled homopolymers used as insulating compounds in crosslinked polyethylene insulated cables rated 15 kV and above.

In have found that crosslinked polyethylene insulation made of unfilled copolymer is more resistant to formation of electrochemical trees than crosslinked polyethylene insulation made of unfilled homopolymers. This makes the unfilled copolymer insulation the preferred insulation for high voltage power cables of the present invention. Extension of service life of the polymeric insulation cables insulated with unfilled copolymer insulation overrides the above indicated apparent disadvantages of copolymer compounds.

An unfilled insulation with a melt index 1 and higher containing an unfilled copolymer with 5% or more of vinyl acetate or ethyl acrylate is suitable for insulation of high voltage power cables resistant to formation and growth of electrochemical trees.

In order to demonstrate the resistance of the copolymer insulation to formation of electrochemical trees a special series of tests on miniature cables was made.

Miniature XLPE insulated cables (50 mils of insulation thickness) have been manufactured with insulation made of (1) conventional Union Carbide $4201_R$ compound and (2) with ethylenevinyl acetate copolymer with a melt index 2, and containing 15% of vinyl acetate.

After manufacture, both cables were subjected to heat treatment to diffuse out the by-products of the crosslinking reaction. Subsequently, the cables were subjected to an electrochemical treeing test at 4.3 kV, 60 Hz a.c. for 24 days with water in the conductor and in the cable environment. A.C. breakdown voltages were measured on both cables after heat treatment only and after heat treament and electrochemical treeing tests. The results in a form of average breakdown voltages (10% increase every 5 minutes), obtained on ten samples in each case, are summarized in Table 2.

TABLE 2

| | Cables Mde of Union Carbide 4201 XLPE Compound$^R$ | Ethylene-Vinyl Acetate Copolymer |
|---|---|---|
| Breakdown Voltage After Heat Treatment only kV | 45 (100%) | 42 (100%) |
| Breakdown Voltage After | 35 (75%) | 47 (112%) |

TABLE 2-continued

| | Cables Mde of Union Carbide 4201 XLPE Compound[R] | Ethylene-Vinyl Acetate Copolymer |
|---|---|---|
| Heat Treatment and Electrochemical Treeing Test kV | | |

Table 2 indicates that within 24 days of electrochemical treeing test, breakdown voltage of conventional cables decreased by 22% while of the cables made of copolymer type compound increased by 12%. The latter increase in the breakdown voltage is attributed to relaxation of the insulation during the electrochemical treeing test. If, during the test, electrochemical trees would be developed in this insulation, the breakdown voltage would decrease in spite of the insulation relaxation.

It will be understood that the foregoing description of preferred embodiments of the present invention is for purposes of illustration only, and that the various structural and operational features as herein disclosed are susceptible to a number of modifications and changes, none of which entails any departure from the spirit and scope of the present invention as defined in the hereto appended claims.

What is claimed is:

1. A method for fabricating an electrochemical tree resistant high voltage electrical cable, said method comprising the steps of:
   - extruding a multi-layer insulation structure over a continuously advancing stranded cable conductor;
   - curing the insulation structure by applying a pressurized curing medium to the outer surface thereof;
   - gradiently cooling the cable to approximately room temperature with a pressurized cooling fluid; and
   - applying internal pressure through said conductor outwardly against the insulation structure, and maintaining the internal pressure throughout said cooling step, said internal pressure being less than that of said cooling fluid.

2. An electrochemical tree resistant high voltage electrical cable manufactured by the method of claim 1.

3. An insulated cable fabricated in accordance with the method of claim 2 wherein the insulation is a cross-linked polyethylene copolymer.

4. An insulated cable fabricated in accordance with the method of claim 3 wherein said polyethylene copolymer is unfilled, has a melt index of at least one, and contains at least five percent vinyl acetate or ethylacrylate.

5. In an apparatus for extruding an insulation layer over an electrical conductor including means for accepting the conductor, means operatively connected to said accepting means for extruding the insulation layer over said conductor, means operatively connected to said extruding means for curing the insulation layer and means operatively connected to said curing means for cooling said insulation layer, the improvment comprising:
   - a source of pressurized fluid;
   - means operatively connected to said accepting means for injecting said pressurized fluid into said conductor for applying pressure outwardly against the insulation layer during the cooling thereof by said cooling means.

6. The apparatus of claim 5 further comprising:
   - means operatively connected to said curing means and said cooling means for applying external pressure inwardly against the insulation layer, said external pressure being greater than said internal pressure.

7. Apparatus in accordance with claim 6, wherein said curing means comprises:
   - a mini-curing pipe connecting said extruding means to said cooling means;
   - a source of pressurized fluid having an ingredient characterized by a dielectric constant less than 20, a resistivity greater than $10^{10}$ ohm-cm., a boiling point at curing pressure of greater than 85° C. and a molecular weight of less than 300.

8. The apparatus of claim 5 wherein the diameter of the means for extruding said insulation layer over said conductor is substantially equal to the diameter of said insulation layer.

* * * * *